Aug. 15, 1950 W. H. KIEBER 2,518,553
CLOSURE PLATE AND VALVE ASSEMBLY
FOR SHOCK ABSORBERS
Filed Oct. 18, 1945
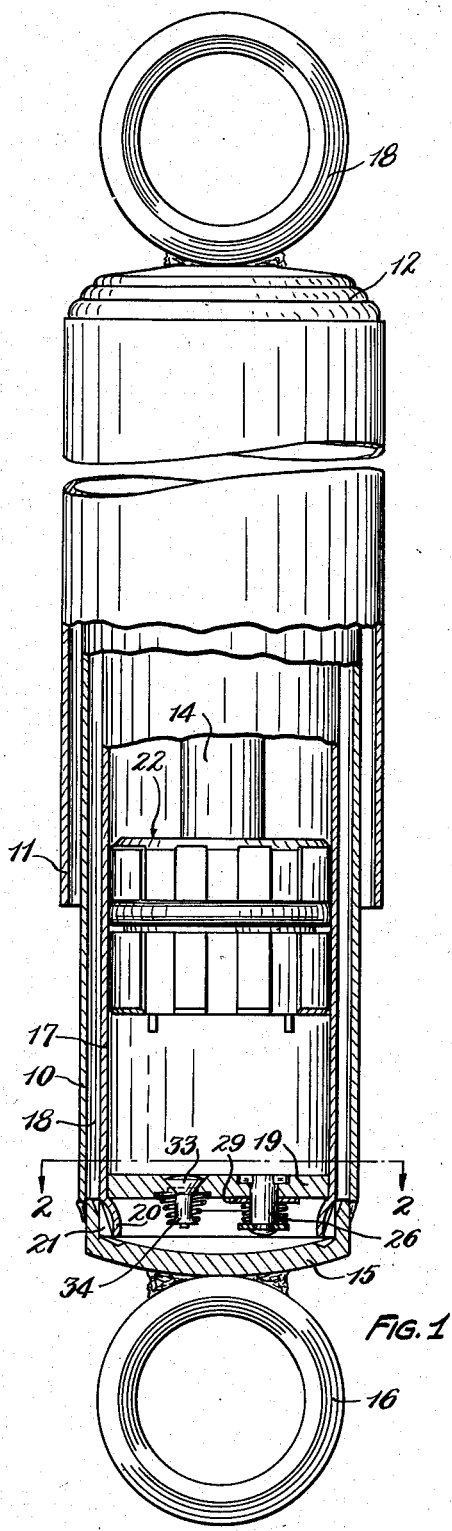
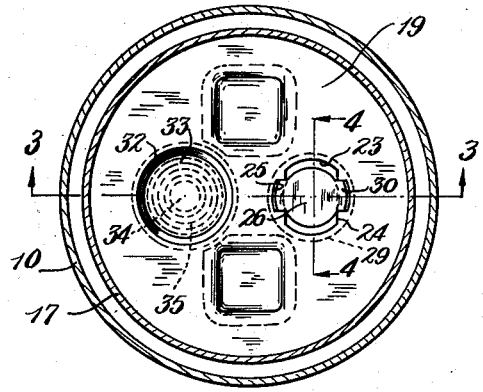
FIG. 2
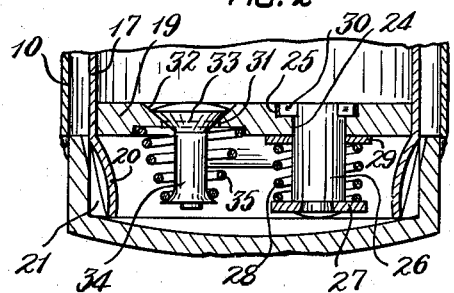
FIG. 3
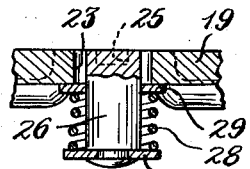
FIG. 4
FIG. 1
INVENTOR.
WILLIAM H. KIEBER
BY
Kris Hudson Boughton & Williams
ATTORNEYS

Patented Aug. 15, 1950

2,518,553

UNITED STATES PATENT OFFICE 2,518,553

CLOSURE PLATE AND VALVE ASSEMBLY FOR SHOCK ABSORBERS

William H. Kieber, Detroit, Mich., assignor to The Gabriel Company, Cleveland, Ohio, a corporation of Ohio Application October 18, 1945, Serial No. 623,089

2 Claims. (Cl. 251—144)

This invention relates to a closure plate and valve assembly for a shock absorber and particularly for a fluid shock absorber.

Although the invention is applicable to various types of fluid shock absorbers it is illustrated and explained herein by way of example as embodied in a direct double acting hydraulic shock absorber.

An object of the invention is to provide in a fluid shock absorber an improved and novel valve means for controlling the displacement of the fluid from the cylinder during the impact or compression stroke of the piston.

Another object of the invention is to provide a valve means which is so constructed that it can be readily mounted in or removed from the opening which it controls.

A further object is to provide in a fluid shock absorber of the type having a working cylinder closed at one end by a closure member or plate, improved and novel valve means for controlling the passage of fluid through said opening in one direction and which valve means can be readily and quickly assembled in the opening from the exterior of the cylinder, wherefore in the case of a hydraulic shock absorber and in the assembly of the shock absorber the cylinder can be filled through the opening with liquid, such as oil, before the valve is mounted therein and then the valve can be operatively assembled in the opening of the closure plate or member and thus the valve assembly has the dual function of acting as a filler plug.

A still further object of the invention is to provide an improved combination of impact valve and recoil valve for controlling the displacement of the fluid from the cylinder of a shock absorber during the impact stroke of the piston and for controlling the return of the fluid into the cylinder during the movement of the piston in the opposite direction, i. e., during the recoil stroke.

Further and additional objects and advantages not hereinbefore referred to will become apparent during the detailed description of an embodiment of the invention which is to follow.

Referring to the accompanying drawing illustrating said embodiment:

Fig. 1 is a partial elevational and longitudinal sectional view through a direct acting hydraulic shock absorber.

Fig. 2 is a transverse sectional view on a larger scale taken substantially on line 2—2 of Fig. 1, looking in the direction of the arrows.

Fig. 3 is a longitudinal sectional view taken substantially on line 3—3 of Fig. 2, looking in the direction of the arrows, and Fig. 4 is a fragmentary sectional view taken along line 4—4 of Fig. 2 looking in the direction of the arrows.

The shock absorber illustrated comprises a substantially cylindrical casing 10 which has relative telescoping movement within a cylindrical housing 11 that is spaced radially outwardly from the casing 10. The upper end of the housing 11 is closed by an inverted cup-shaped closure or cap member 12 provided on its outer side with an eye 13 with which the piston rod 14 is integral, or is operatively connected thereto, as will be well understood and as is clearly shown in Beecher Patent No. 2,369,007, February 6, 1945.

The lower end of the casing 10 is closed by a cup-shaped closure member 15 which has secured to its outer side a lower eye 16. The closure members 12 and 15 extend into the housing 11 and the casing 10, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 13 and 16. These pins or rods may be operatively connected with the eyes 13 and 16 by suitable means well known in the art, wherefore relative movement between the frame and axle of the vehicle will cause relative telescoping movement between the casing 10 and the housing 11 and relative movement of the piston in the pressure or working cylinder as will be well understood.

The pressure or working cylinder 17 of the shock absorber is disposed within the casing 10 in spaced concentric relationship therewith so that the space defined by the casing 10, cylinder 17, closure member 15 and the closure member for the upper end of the casing and cylinder (not shown herein but clearly illustrated in said Beecher Patent 2,369,007) constitutes a reservoir 18 for the oil or liquid in the shock absorber.

The lower end of the cylinder 17 extends into the cup-shaped closure member 15 and is secured thereto by suitable means understood in the art. The cylinder 17 slightly upwardly of the lower end has secured therein a closure plate 19 and the cylinder below said closure plate is provided with an inwardly extending bead 20 which serves to retain the closure plate in position while the cup-shaped closure member 15 is provided with a plurality of circumferentially spaced internal grooves or channels 21 which place the reservoir 18 in communication with the space between the closure plate 19 and the bottom of the cup-shaped closure member 15.

The piston rod 14 carries at its inner end a piston designated generally by the numeral 22 and said piston may be of any suitable construction and provided with any desired valve means. The piston 22 shown herein for purposes of illustration corresponds to the piston shown in said Beecher Patent 2,369,007 and is provided with means allowing for a relatively free flow of fluid from one side of the piston to the other during the movement of the piston toward the closure plate 19 and for a more restricted flow from one side of the piston to the other during its movement in the opposite direction, i. e., toward the upper end of the cylinder 17 as viewed in the drawing. The movement of the piston 22 toward the closure plate 19 is referred to herein as the impact or compression stroke since this is the movement that occurs when the vehicle springs are compressed upon impact with an obstruction or irregularity in the surface of the roadway. The movement of the piston in the opposite direction, i. e., towards the upper end of the cylinder, is referred to herein as the recoil stroke since this is the movement that occurs when the vehicle springs recoil or expand following their compression.

The closure plate 19 is provided with an opening that is controlled by an impact valve now to be described. The opening just referred to in the closure plate 19 is indicated at 23 and is so shaped as to have arcuate ends on its major or maximum diameter interconnected by diametrically opposed flat sides 24 defining its minor or minimum diameter. The closure plate 19 on its inner side within the cylinder and midway of the flat sides 24 of the opening is provided with diametrically aligned recesses 25. The impact valve assembly which controls the passage of fluid through the opening 23 comprises a valve pin 26 of a diameter slightly less than said minimum diameter of the opening, wherefore it has a slight clearance with respect to the flat sides 24 of the opening and a substantial clearance with respect to the arcuate ends or portions of the opening. The valve pin 26 has fixed to one end a suitable spring retaining washer 27 which forms an abutment for one end of a coil valve spring 28, the opposite end of which spring engages a valve plate 29 that is slidable on the valve pin 26. The end of the valve pin 26 opposite to the end carrying the retainer washer 27 is provided with radially projecting diametrically aligned lugs 30, the outer ends of which are of arcuate configuration, with the distance between said ends being slightly less than the maximum diameter of the opening 23.

It will be seen, therefore, that the impact valve assembly can be mounted in position in the opening from the outer side of the closure plate by passing the pin 26 through the opening with the lugs 30 located in the major diameter of the opening and then when said lugs are within the cylinder giving the pin a 90° turn to bring the lugs into registry with the recesses 25 located at the diametrically opposite sides of the opening. In passing the pin through the opening the valve plate 29 engages the outer side of the closure plate 19 and as soon as the lugs 30 are in registry with the recesses 25 the spring 28 reacting against the valve plate 29 and the retainer washer 27 engages said lugs in said recesses and maintains the same therein. It will also be noted that the spaces between the valve pin 26 and the arcuate portions of the opening 23 provide ample passageways for the flow of fluid through the opening from the interior of the cylinder to the outer side of the closure plate 19 and that the valve plate 29 controls these passageways and acts when seated to seal the opening against the passage of fluid therethrough in the direction referred to.

The closure plate 19 is provided with a second opening therethrough and said second opening has a cylindrical portion 31 and a tapered or conical portion 32. The passage of fluid through this second opening is controlled by a recoil or replenishing valve comprising a conical head 33 mounted on a stud or pin 34. The head 33 when the replenishing valve is seated engages the conical portion 32 of this second opening and acts to seal said opening. This replenishing valve is held seated by means of a tapered coil spring 35 surrounding the pin or stud 34 and having its larger end engaging in a recess formed in the closure plate 19 concentric to the second opening and its smaller end engaging a flared portion of the pin or stud 34. It will be noted that the stud 34 does not require a positive guide during the valve opening and closing movements since the conical valve spring 35 and the conical valve head 33 together with the conical portion 32 of the opening act to make the valve self-centering and self-seating. It will also be noted that due to the conical configuration of the valve seat and the valve head a slight unseating of the head 33 provides a relatively large flow area and also that said flow area is proportionately large for the size of the valve.

In assembling the shock absorber embodying the construction just described, the closure plate 19 with the replenishing valve 33 positioned in its opening is secured in the cylinder 17 and said cylinder with the piston rod 14 and piston 22 extending into it is assembled in the casing 10 and housing 11. However, at this time the closure member 15 is not yet assembled in position. The cylinder 17 is filled with the desired amount of liquid, such as oil, through the opening 23 in the closure plate 19 and then the impact valve assembly is mounted in said opening by passing the valve pin 26 therethrough and then turning the pin 90° to effect the engagement of the lugs 30 in the recesses 25, as has been previously explained. Hence it will be seen that the impact valve assembly performs the dual function of a filler plug and an impact valve. After the cylinder 17 has been filled with liquid the closure member 15 is mounted in assembled position.

It will be noted that once the impact valve assembly is mounted in position in the closure plate 19 the lugs 30 are held in the recesses 25 by the valve spring 28 and hence the valve pin 26 is maintained against turning or rotative movement and thus remains in properly assembled position in the opening 23 throughout the use of the shock absorber.

It will be understood that during the operation of the shock absorber and when the piston 22 moves toward the closure plate 19 on the impact stroke of the piston, the replenishing valve 33 remains seated and no liquid or fluid can pass out of the cylinder 17 until a pressure is developed sufficient to move the valve plate 29 of the impact valve away from the closure plate 19 against the action of the spring 28 to allow the fluid to flow through the opening 23 around the valve pin 26 to the outer side of the closure plate 19 and thence through the passages 21 into the reservoir 18. It will also be understood that on the recoil stroke of the piston 22, i. e., the movement thereof toward the closure member 12, the valve plate 29 of the impact valve assembly remains seated against the closure plate 19 and hence no fluid flows through the opening 23 into the cylinder 17. However, during this recoil stroke the replenishing valve 33 moves against the action of its valve spring 35 to unseated position and the fluid is free to flow through the replenishing valve opening and into the cylinder 17 behind the piston 22 and thus to replenish the fluid which has been displaced from the cylinder during the impact or compression stroke. Due to the valve arrangement carried by the closure plate 19 improved shock absorbing characteristics are obtained and the impact valve assembly contributes to the desired shock absorbing action on the impact or compression stroke and also allows the fluid displaced by the piston rod 14 during said impact stroke to pass from the cylinder into the reservoir.

Although a preferred embodiment of the invention has been illustrated and described herein it will be understood that the invention is susceptible of various modifications and adaptations within the scope of the appended claims.

Having thus described my invention, I claim:

1. A closure plate and valve assembly adapted to be mounted in one end of the cylinder of a fluid shock absorber and comprising a closure plate having an opening, a valve pin inserted through the opening and provided on an end thereof with laterally extending lugs, said plate being provided on one side thereof adjacent said opening with recesses adapted to receive said lugs, said opening having portions through which said lugs can be passed and which provide flow passages between the pin and the wall defining said opening, a valve movable on said pin adjacent the other side of said plate, and a spring carried by said pin and acting to normally seat said valve against said other side of said plate and close said opening and also acting to maintain said lugs engaged in said recesses, wherefore said valve assembly is held in position in said opening.

2. A closure plate and valve assembly as defined in claim 1 and wherein the lugs on said pin are diametrically aligned and extend radially outwardly from the pin, and said opening has a maximum diameter slightly greater than the distance between the outer ends of said lugs and a minimum diameter slightly greater than the diameter of said pin, said recesses being located adjacent the minimum diameter of said opening wherefore said pin is inserted through the opening with said lugs located in the maximum diameter thereof and is then turned to register said lugs with said recesses.

WILLIAM H. KIEBER.

REFERENCES CITED

The following references are of record in the file of this patent:

UNITED STATES PATENTS

| Number | Name | Date |
|---|---|---|
| 717,365 | Ehrhardt | Dec. 30, 1902 |
| 1,871,969 | Elsey | Aug. 16, 1932 |
| 1,990,516 | Beckel | Feb. 12, 1935 |
| 2,087,451 | Rossman et al. | July 20, 1937 |
| 2,379,750 | Rossman | July 3, 1945 |
| 2,396,227 | Beecher | Mar. 12, 1946 |

FOREIGN PATENTS

| Number | Country | Date |
|---|---|---|
| 203,299 | Switzerland | Feb. 28, 1938 |